(12) United States Patent
Su et al.

(10) Patent No.: US 10,892,805 B2
(45) Date of Patent: Jan. 12, 2021

(54) BEAM SCANNING METHOD AND RELATED DEVICE

(71) Applicant: China Academy of Telecommunications Technology, Beijing (CN)

(72) Inventors: Xin Su, Beijing (CN); Qiubin Gao, Beijing (CN); Runhua Chen, Beijing (CN); Tamrakar Rakesh, Beijing (CN); Chuanjun Li, Beijing (CN); Mengjun Wang, Beijing (CN); Hui Li, Beijing (CN); Qiuping Huang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/338,322

(22) PCT Filed: Jul. 25, 2017

(86) PCT No.: PCT/CN2017/094347
§ 371 (c)(1),
(2) Date: Mar. 29, 2019

(87) PCT Pub. No.: WO2018/059095
PCT Pub. Date: Apr. 5, 2018

(65) Prior Publication Data
US 2020/0028549 A1 Jan. 23, 2020

(30) Foreign Application Priority Data
Sep. 30, 2016 (CN) .......................... 2016 1 0877303

(51) Int. Cl.
*H04B 7/0452* (2017.01)
*H04B 7/0408* (2017.01)
(Continued)

(52) U.S. Cl.
CPC ......... *H04B 7/0452* (2013.01); *H04B 7/0408* (2013.01); *H04B 7/0695* (2013.01); *H04L 5/0023* (2013.01); *H04W 72/046* (2013.01)

(58) Field of Classification Search
CPC .................................................. H04B 7/0452
(Continued)

(56) References Cited

U.S. PATENT DOCUMENTS 6,347,220 B1 * 2/2002 Tanaka .................. H01Q 1/246
370/320
2010/0214169 A1 8/2010 Kafle
(Continued)

FOREIGN PATENT DOCUMENTS

| CN | 103875271 A | 6/2014 |
| CN | 104734761 A | 6/2015 |
| CN | 105007126 A | 10/2015 |

*Primary Examiner* — Lihong Yu
(74) *Attorney, Agent, or Firm* — Foley & Lardner LLP

(57) ABSTRACT

Disclosed are a beam scanning method and a related device, used for solving the problem that, during the existing process of determining the optimal transceiving beam by performing traversal search on a combination of potential transceiving beams, a large amount of system overhead needs to be occupied, thus reducing the system efficiency and the adaptability to a time-varying channel. The method comprises: a first communication node determines at least one transmitted beam according to the optimal receiving beam group between a receiver of the first communication node and a transmitter of a second communication node; the first communication node sequentially sends a signal to the second communication node by means of the transmitter according to the determined at least one transmitted beam until the optimal transmitted beam is determined.

11 Claims, 2 Drawing Sheets

201
A second communication node determines at least one reception beam according to an optimum group of transmission beams between a transmitter of the second communication node and a receiver of a first communication node 202
The second communication node receives a signal transmitted by a transmitter of the first communication node through a receiver of the second communication node using the determined at least one reception beam in sequence until an optimum reception beam is determined

(51) Int. Cl.
    *H04B 7/06*       (2006.01)
    *H04L 5/00*       (2006.01)
    *H04W 72/04*    (2009.01)

(58) Field of Classification Search
    USPC .......................................................... 375/267
    See application file for complete search history.

(56) References Cited

U.S. PATENT DOCUMENTS

| | | | |
|---|---|---|---|
| 2011/0286325 A1* | 11/2011 | Jalali | H04B 7/18506 |
| | | | 370/221 |
| 2015/0326359 A1 | 11/2015 | Subramanian et al. | |
| 2015/0365155 A1 | 12/2015 | Subramanian et al. | |

* cited by examiner

BEAM SCANNING METHOD AND RELATED DEVICE

This application is a National Stage of International Application No. PCT/CN2017/094347, filed Jul. 25, 2017, which claims the benefit of priority to Chinese Patent Application No. 201610877303.0, filed with the Chinese Patent Office on Sep. 30, 2016, both of which are hereby incorporated by reference in their entireties.

FIELD

The present invention relates to the field of communications, and particularly to a beam scanning method and device.

BACKGROUND

Since the Multi-Input Multi-Output (MIMO) technologies are of significance to improvements of a peak rate, and of an utilization ratio of system spectrums, radio access technology standards, such as Long Term Evolution (LTE), LTE-Advanced (LTE-A), are built based on the MIMO technologies and the Orthogonal Frequency Division Multiplexing (OFDM) technologies.

A performance gain of the MIMO technologies comes from the spatial freedom available in a multi-antenna system, so the most important evolvement of the MIMO technologies being standardized is the extension of the dimensionality thereof. Wherein, at most four layers of MIMO transmission can be supported in the LTE Rel-8. The Multi-User MIMO (MU-MIMO) technology is enhanced in the Rel-9 so that at most four downlink data layers can be supported in MU-MIMO transmission in the Transmission Mode (TM) 8. An 8-port Channel State Information-Reference Signal (CSI-RS), a User Equipment (UE)-specific Reference Signal (URS), and a multi-granularity codebook are introduced into the Rel-10 to thereby further improve the spatial resolution of channel state information, and further extend a transmission capacity of Single-User MIMI (SU-MIMO) to at most eight data layers.

In a base station antenna system with a legacy Passive Antenna System (PAS) structure, a plurality of antenna ports are arranged horizontally, each port corresponds to a separate radio frequency-intermediate frequency-baseband channel, and a plurality of antenna elements in a vertical dimension corresponding to each port are connected through a radio frequency cable, so with the existing MIMO technologies, characteristics in space of signals of respective UEs in a horizontal dimension can be optimized only by adjusting relative amplitudes and/or phases between different ports in the horizontal dimension, and only uniform sector-level beam-forming can be applied in the vertical dimension. After an Active Antenna System (AAS) technology is introduced into a mobile communication system, the base station antenna system can be provided with a higher degree of freedom in the vertical dimension, to thereby optimize a UE-level signal in a three-dimensional space.

Further to the researches, the standardization efforts, and the development of the antenna technologies above, the MIMO technologies are further evolving into three-dimension and massive MIMO technologies in the industry. At present, the $3^{rd}$ Generation Partnership Project (3GPP) is researching and standardizing the Full Dimension-MIMO (FD-MIMO) technology, and the academe is researching and testing the MIMO technologies based upon a more massive array of antennas more prospectively. As the researches, and results of preliminary channel tests, of the academe show, the massive MIMO technologies will greatly improve the utilization ratio of the frequency bands of the system, and support a larger number of access users, so the respective research organizations have regarded the MIMO technologies as one of the most promising physical-layer technologies in next-generation mobile communication systems.

A massive array of antennas is necessary to the massive MIMO technologies. Although the spatial resolution can be maximized, and the MU-MIMO performance can be optimized, with a full-digital array of antennas, this structure necessitates a large number of Analog-Digital (AD) and/or Digital-Analog (DA) converters, and a large number of integral radio frequency-baseband processing channels, so there will be a considerable burden due to both the cost of the devices, and the complexity of baseband processing. This problem is particularly serious in a high frequency band and in a wide bandwidth.

In order to lower the implementation cost and the device complexity of the massive MIMO technologies, the hybrid digital-analog beam-forming technology has been proposed in recent years. The so-called hybrid digital-analog beam-forming refers to the addition of analog beam-forming to a radio frequency signal proximate to a front end of an antenna system based on legacy digital beam-forming. With analog beam-forming, a transmission signal can be matched roughly with a channel in a simple way. The dimensionality of equivalent channels resulting from analog beam-forming is less than the real number of antennas, so the number of AD and/or DA converters, the number of digital channels, and the complexity of corresponding baseband processing, as required after analog beam-forming are greatly lowered. A remaining part of interference from analog beam-forming can be further handled in the digital domain to thereby guarantee the quality of MU-MIMO transmission.

As compared with the full-digital beam-forming, hybrid digital-analog beam-forming is a tradeoff between the performance and the complexity, and expected to be significantly promising in a system operating in a high frequency band and in a wide bandwidth, or with a large number of antennas.

With the MIMO technologies and particularly the MU-MIMO technologies, the precision of pre-coding and beam/forming, and the performance of a scheduling algorithm will be determined directly by the precision of channel state information available to the network side, so the performance of the system as a whole will be affected by the precision. Accordingly, how to obtain the channel state information has always been treated as one of core issues in the standardization for MIMO technologies.

According to the existing LTE signal structure, a reference signal is generally inserted into a baseband signal, so a channel state required for digital beam-forming can be obtained by estimating a channel of the reference signal in the baseband signal. However, since the number of equivalent channels resulting from analog beam-forming is less than the real number of antennas, the dimensionality of a channel matrix obtained from the reference signal is far less than the dimensionality of the entire channel matrix experienced by the antennas. Accordingly the spatial resolution and the interference suppression capability available from digital beam-forming are lost to some extent. While, processing of analog beam-forming is closer to the physical antenna side, and thus an MIMO channel of the analog beam-forming has a higher degree of freedom. However there is no way to estimate the reference signal inserted into the baseband signal, so the channel state information obtained in the digital domain cannot be applied directly to analog beam-forming in either a Frequency Division Duplex (FDD) system or a Time Division Duplex (TDD) system.

Accordingly, in a hybrid digital-analog beam-forming system, analog beams generally can only be selected through searching (or training). In this process, a transmitting end transmits a group of beams, and a receiving end tries to receive them using a group of preset beams to thereby determine an optimum combination of transmission and reception beams. When a channel condition changes (e.g., a channel is shielded), the system proceeds again to a beam searching process to perform traversal search on potential combinations of transmission and reception beams.

As can be apparent, there is such a considerable overhead of the system in the existing beam searching process that degrades the efficiency of the system, and the adaptability thereof to a channel varying over time.

SUMMARY

Embodiments of the invention provides a beam scanning method and device so as to address the problem in the prior art that the process of determining optimum transmission and reception beams by traversing potential combinations of transmission and reception beams has such a considerable overhead of the system that degrades the efficiency of the system, and the adaptability thereof to a channel varying over time.

Particular technical solutions according to the embodiments of the invention are as follows.

In a first aspect, an embodiment of the invention provides a beam scanning method including:
    determining, by a first communication node, at least one transmission beam according to an optimum group of reception beams between a receiver of the first communication node and a transmitter of a second communication node; and
    transmitting, by the first communication node, a signal to the second communication node through a transmitter of the first communication node using the determined at least one transmission beam in sequence until an optimum transmission beam is determined.

In a possible implementation, determining, by the first communication node, the at least one transmission beam according to the optimum group of reception beams between the receiver of the first communication node and the transmitter of the second communication node includes:
    determining, by the first communication node, a set of transmission beams according to at least one beam in the optimum group of reception beams, and selecting at least one beam from the set of transmission beams as the at least one transmission beam, wherein the set of transmission beams includes at least one beam.

In a possible implementation, determining, by the first communication node, the set of transmission beams according to the at least one beam in the optimum group of reception beams includes:
    selecting, by the first communication node, a part or all of beams in the optimum group of reception beams to constitute the set of transmission beams; or
    determining, by the first communication node, all available beams by centering on each of a part or all of beams in the optimum group of reception beams, and selecting a part of all the available beams to constitute the set of transmission beams.

In a possible implementation, identification information of a part or all of beams in an optimum group of transmission beams, corresponding to the optimum group of reception beams, of the transmitter of the second communication node is carried in the signal transmitted by the first communication node to the second communication node through the transmitter of the first communication node using the determined at least one transmission beam.

In a possible implementation, the determined at least one transmission beam satisfies a first transmission beam parameter, wherein the first transmission beam parameter includes one or more of the number of transmission beams, generation schemes of respective beams among the transmission beams, or relative relationships between the respective beams among the transmission beams.

In a possible implementation, transmitting, by the first communication node, the signal to the second communication node through the transmitter of the first communication node using the determined at least one transmission beam includes:
    transmitting, by the first communication node, the signal to the second communication node using the determined at least one transmission beam according to a second transmission beam parameter; wherein the second transmission beam parameter includes one or more of a time and/or frequency resource for the determined at least one transmission beam, a time-frequency pattern of the signal transmitted to the second communication node using the determined at least one transmission beam, or a sequence of the signal transmitted to the second communication node using the determined at least one transmission beam.

In a second aspect, an embodiment of the invention provides a beam scanning method including:
    determining, by a second communication node, at least one reception beam according to an optimum group of transmission beams between a transmitter of the second communication node and a receiver of a first communication node; and
    receiving, by the second communication node, a signal transmitted by a transmitter of the first communication node through a receiver of the second communication node using the determined at least one reception beam in sequence until an optimum reception beam is determined.

In a possible implementation, determining, by the second communication node, the at least one reception beam according to the optimum group of transmission beams between the transmitter of the second communication node and the receiver of the first communication node includes:
    determining, by the second communication node, a set of reception beams according to at least one beam in the optimum group of transmission beams, and selecting at least one beam from the set of reception beams as the at least one reception beam, wherein the set of reception beams includes at least one beam.

In a possible implementation, determining, by the second communication node, the set of reception beams according to the at least one beam in the optimum group of transmission beams includes:
    selecting, by the second communication node, a part or all of beams in the optimum group of transmission beams to constitute the set of reception beams; or
    determining, by the second communication node, all the available beams by centering on each of a part or all of beams in the optimum group of transmission beams, and selecting a part of all the available beams to constitute the set of reception beams.

In a possible implementation, receiving, by the second communication node, the signal transmitted by the transmitter of the first communication node through the receiver of the second communication node using the determined at least one reception beam in sequence until an optimum reception beam is determined includes:

stopping, by second communication node, receiving the signal transmitted by the transmitter of the first communication node using a remaining determined reception beam after determining that the signal transmitted by the transmitter of the first communication node is received using a determined first reception beam and the received signal carries identification information of a part or all of beams in an optimum group of transmission beams of the first communication node, and determining the optimum reception beam of the receiver of the second communication node according to the identification information.

In a third aspect, an embodiment of the invention provides a communication node including:

a first processing module configured to determine at least one transmission beam according to an optimum group of reception beams between a receiver of the communication node and a transmitter of a second communication node; and a second processing module configured to transmit a signal to the second communication node through a transmitter of the communication node using the determined at least one transmission beam in sequence until an optimum transmission beam is determined.

In a possible implementation, the first processing module is configured to:

determine a set of transmission beams according to at least one beam in the group optimum of reception beams, and select at least one beam from the set of transmission beams as the at least one transmission beam, wherein the set of transmission beams includes at least one beam.

In a possible implementation, the first processing module is configured to:

select a part or all of beams in the optimum group of reception beams to constitute the set of transmission beams; or determine all available beams by centering on each of a part or all of beams in the optimum group of reception beams, and select a part of all the available beams to constitute the set of transmission beams.

In a possible implementation, identification information of a part or all of beams, corresponding to the optimum group of reception beams, in an optimum group of transmission beams of the transmitter of the second communication node is carried in the signal transmitted to the second communication node through the transmitter of the communication node using the determined at least one transmission beam.

In a possible implementation, the determined at least one transmission beam satisfies a first transmission beam parameter, wherein the first transmission beam parameter includes one or more of the number of transmission beams, generation schemes of respective beams among the transmission beams, or relative relationships between the respective beams among the transmission beams.

In a possible implementation, the second processing module is configured to:

transmit the signal to the second communication node through the transmitter of the communication node using the determined at least one transmission beam according to a second transmission beam parameter; wherein the second transmission beam parameter includes one or more of a time and/or frequency resource for the determined at least one transmission beam, a time-frequency pattern of the signal transmitted to the second communication node using the determined at least one transmission beam, or a sequence of the signal transmitted to the second communication node using the determined at least one transmission beam.

In a fourth aspect, an embodiment of the invention provides a communication node including:

a first processing module configured to determine at least one reception beam according to an optimum group of transmission beams between a transmitter of the communication node and a receiver of a first communication node; and a second processing module configured to receive a signal transmitted by a transmitter of the first communication node through a receiver of the communication node using the determined at least one reception beam in sequence until an optimum reception beam is determined.

In a possible implementation, the first processing module is configured to:

determine a set of reception beams according to at least one beam in the optimum group of transmission beams, and select at least one beam from the set of reception beams as the at least one reception beam, wherein the set of reception beams includes at least one beam.

In a possible implementation, the first processing module is configured to:

select a part or all of beams in the optimum group of transmission beams to constitute the set of reception beams; or determine all available beams by centering on each of a part or all of beams in the optimum group of transmission beams, and select a part of all the available beams to constitute the set of reception beams.

In a possible implementation, the second processing module is configured to:

stop receiving the signal transmitted by the transmitter of the first communication node using a remaining determined reception beam, after determining that the signal transmitted by the transmitter of the first communication node is received through the receiver of the communication node using a determined first reception beam and the received signal carries identification information of a part or all of beams in an optimum group of transmission beams of the first communication node, and determine the optimum reception beam of the receiver of the second communication node according to the identification information.

In a fifth aspect, an embodiment of the invention provides a communication node including: a processor, a memory, and a transceiver, wherein the transceiver transmits and receives data under the control of the processor, the memory stores preset programs, and the processor reads and executes the programs in the memory to:

determine at least one transmission beam according to an optimum group of reception beams between a receiver of the communication node and a transmitter of a second communication node; and transmit a signal to the second communication node through a transmitter of the communication node using the determined at least one transmission beam in sequence until an optimum transmission beam is determined.

In a possible implementation, the processor configured to determine a set of transmission beams according to at least one beam in the optimum group of reception beams, and select at least one beam from the set of transmission beams as the at least one transmission beam, wherein the set of transmission beams includes at least one beam.

In a possible implementation, the processor is configured to: select a part or all of beams in the optimum group of reception beams to constitute the set of transmission beams; or determine all available beams by centering on each of a part or all of beams in the optimum group of reception beams, and select a part of all the available beams to constitute the set of transmission beams.

In a possible implementation, identification information of a part or all of beams in an optimum group of transmission beams, corresponding to the optimum group of reception beams, of the transmitter of the second communication node is carried in the signal transmitted to the second communication node using the determined at least one transmission beam.

In a possible implementation, the determined at least one transmission beam satisfies a first transmission beam parameter, wherein the first transmission beam parameter includes one or more of the number of transmission beams, generation schemes of respective beams among the transmission beams, or relative relationships between the respective beams among the transmission beams.

In a possible implementation, the processor is configured to transmit the signal to the second communication node using the determined transmission beam according to a second transmission beam parameter, wherein the second transmission beam parameter includes one or more of a time and/or frequency resource for the transmission beam, a time-frequency pattern of the signal transmitted to the second communication node using the determined at least one transmission beam, or a sequence of the signal transmitted to the second communication node using the determined at least one transmission beam.

In a sixth aspect, an embodiment of the invention provides a communication node including: a processor, a memory, and a transceiver, wherein the transceiver transmits and receives data under the control of the processor, the memory stores preset programs, and the processor reads and executes the programs in the memory to:

determine at least one reception beam according to an optimum group of transmission beams between a transmitter of the communication node and a receiver of a first communication node; and receive a signal transmitted by a transmitter of the first communication node through a receiver of the communication node using the determined at least one reception beam in sequence until an optimum reception beam is determined.

In a possible implementation, the processor is configured to determine a set of reception beams according to at least one beam in the optimum group of transmission beams, and select at least one beam from the set of reception beams as the at least one reception beam, wherein the set of reception beams includes at least one beam.

In a possible implementation, the processor is configured to: select a part or all of beams in the optimum group of transmission beams to constitute the set of reception beams; or determine all available beams by centering on each of a part or all of beams in the optimum group of transmission beams, and select a part of all the available beams to constitute the set of reception beams.

In a possible implementation, the processor is configured to: stop receiving the signal transmitted by the transmitter of the first communication node using a remaining determined reception beam, after determining that the signal transmitted by the transmitter of the first communication node is received through the receiver of the communication node using a determined first reception beam and the received signal carries identification information of a part or all of beams in an optimum group of transmission beams of the first communication node, and determine the optimum reception beam of the receiver of the second communication node according to the identification information.

In a possible implementation, the first communication node determines at least one transmission beam directly according to the optimum group of reception beams between the receiver of the first communication node and the transmitter of the second communication node, and transmits a signal to the second communication node through a transmitter of the first communication node using the determined at least one transmission beam in sequence until an optimum transmission beam is determined, so that a selection range of transmission beams can be greatly narrowed to thereby lower the complexity of beam scanning and an overhead of a system to be occupied effectively, and improve the efficiency of the system, and the adaptability thereof to a channel varying over time.

In the embodiments of the invention, the second communication node determines at least one reception beam directly according to the optimum group of transmission beams between the transmitter of the second communication node and the receiver of the first communication node, and receives a signal transmitted by a transmitter of the first communication node through a receiver of the second communication node using the determined at least one reception beam in sequence until an optimum reception beam is determined, so that a selection range of reception beams can be greatly narrowed to thereby lower the complexity of beam scanning and an overhead of a system to be occupied effectively, and improve the efficiency of the system, and the adaptability thereof to a channel varying over time.

DETAILED DESCRIPTION OF THE EMBODIMENTS

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

In order to address the problem in the prior art that the process of determining optimum transmission and reception beams by traversing potential combinations of transmission and reception beams has such a considerable overhead of the system that degrades the efficiency of the system, and the adaptability thereof to the channel varying over time, the embodiments of the invention provide a beam scanning method. A core idea of the method lies in that, in the case that optimum groups of transmission and reception beams have been determined for one transmission and reception link between a first communication node and a second communication node, optimum groups of transmission and reception beams of another transmission and reception link between the first communication node and the second communication node are determined directly according to the groups of transmission and reception beams of the one transmission and reception link.

Figure 1:
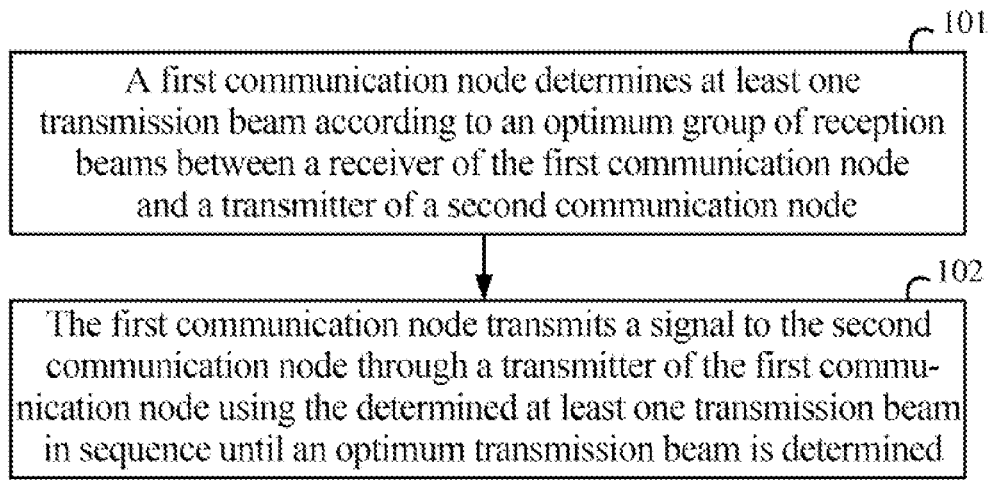
FIG. 1 is a schematic diagram of a process of beam scanning performed by a communication node which is a transmitting end according to an embodiment of the invention.

In a first embodiment of the invention, as illustrated in FIG. 1, a communication node, as a transmitting end, performs a process of beam scanning as follows.

In operation 101, a first communication node determines at least one transmission beam according to an optimum group of reception beams between a receiver of the first communication node and a transmitter of a second communication node.

Wherein, the optimum group of reception beams between the receiver of the first communication node and the transmitter of the second communication node is obtained though legacy beam searching or training, etc., or can be obtained through modified legacy beam searching or training, etc., with the first communication node being a receiving end and the second communication node being a transmitting end, although the means by which the optimum group of reception beams is obtained is not limited herein.

In a particular implementation, the first communication node determines a set of transmission beams according to at least one beam in the optimum group of reception beams, and selects at least one beam from the set of transmission beams as the transmission beam(s), wherein the set of transmission beams includes at least one beam. For example, the first communication node determines sets of beams by respectively centering on each of a part or all of beams in the optimum group of reception beams, and determines the determined sets of beams as the set of transmission beams.

Particularly, the first communication node determines the set of transmission beams according to at least one beam in the optimum group of reception beams in at least the following two particular implementations.

In a first implementation, the first communication node selects a part or all of beams in the optimum group of reception beams to constitute the set of transmission beams. Particularly, the first communication node can select a part or all of beams in the optimum group of reception beams to constitute the set of transmission beams by selecting the beams randomly or under a preset rule, although the embodiment of the invention will not be limited thereto.

In a second implementation, the first communication node determines all available beams by centering on each of a part or all of beams in the optimum group of reception beams, and selects a part of all the available beams to constitute the set of transmission beams. For example, when selecting beams by centering on a certain beam, a group of beams, with the highest correlations with the center beam (or with the shortest distances to the center beam in other vector distance measures), may be selected according to correlations between weight vectors (or the other vector distance measures).

In a particular implementation, the transmission beam(s) determined by the first communication node satisfies (or satisfy) a first transmission beam parameter, wherein the first transmission beam parameter includes one or more of the number of transmission beams, generation schemes of respective beams among the transmission beams, or relative relationships between the respective beams among the transmission beams. Particularly, the first communication node determines at least one transmission beam according to the optimum group of reception beams between the receiver of the first communication node and the second communication node, and the first transmission beam parameter.

In the operation 102, the first communication node transmits a signal to the second communication node through a transmitter of the first communication node using the determined at least one transmission beam in sequence until an optimum transmission beam is determined.

In a particular implementation, the signal transmitted by the first communication node to the second communication node through the transmitter using the determined transmission beam(s) carries identification information of a part or all of beams in an optimum group of transmission beams, corresponding to the optimum group of reception beams, of the transmitter of the second communication node. In this implementation, the second communication node receiving the signal transmitted by the transmitter of the first communication node through beam scanning can determine an optimum group of reception beams according to the identification information carried in the signal, and terminate ahead of time a process of scanning and searching for an optimum reception beam; or the second communication node receiving the signal transmitted by the transmitter of the first communication node through beam scanning can determine a subset of a set of reception beams according to the identification information carried in the signal, scan the beams in the sub-set, and determine an optimum reception beam, and for example, the second communication node determines a subset of the set of reception beams by taking each of a part or all of beams indicated by the identification information as a center beam.

In a particular implementation, the first communication node transmits the signal to the second communication node through the transmitter using the determined transmission beam(s) according to a second transmission beam parameter; wherein the second transmission beam parameter includes one or more of a time and/or frequency resource for the transmission beam, a time-frequency pattern of the signal transmitted to the second communication node using the determined at least one transmission beam, or a sequence of the signal transmitted to the second communication node using the transmission beam(s).

In a particular implementation, the first communication node obtains the first transmission beam parameter and/or the second transmission beam parameter in a number of implementations including but not limited to the following implementations.

In a first implementation, the first communication node determines the first transmission beam parameter and/or the second transmission beam parameter according to specified general system information, and a capability of the first communication node.

For example, the first communication node determines the first transmission beam parameter and/or the second transmission beam parameter according to the specified general system information, e.g., a bandwidth, a frequency, a network identifier of the second communication node, an identifier of a network coverage area to which the second communication node belongs, etc., and the capability, e.g., a calibration capability, of the first communication node.

In a second implementation, the first communication node determines the first transmission beam parameter and/or the second transmission beam parameter according to an indication of the second communication node.

Particularly, the first communication node determines the first transmission beam parameter and/or the second transmission beam parameter according to one or more of a system broadcast message, Radio Resource Control (RRC) signaling, or Downlink Control Information (DCI) signaling, transmitted by the second communication node.

In a third implementation, the first communication node determine the first transmission beam parameter and/or the second transmission beam parameter according to an indication of a network side.

Particularly, the first communication node determines the first transmission beam parameter and/or the second transmission beam parameter according to one or more of a system broadcast message, RRC signaling, or DCI signaling, transmitted by the network side.

Particularly, the first transmission beam parameter and/or the second transmission is or are configured according to the capability of the first communication node.

Particularly, if the first communication node has a calibration capability or can guarantee the reciprocity of transmission and reception to some extent, and the second communication node or the network side can obtain the capability of the first communication node, and for example, the network side obtains the capability of the first communication node according to a report of the first communication node, then the second communication node or the network side may indicate the first transmission beam parameter and/or the second transmission beam parameter, which is or are transmission beam parameters with the reciprocity, to the first communication node, so that the first communication node uses a smaller number of transmission beams for scanning, at a specific time-frequency resource.

Here, if the first transmission beam parameter does not include the number of transmission beams, then the first communication node and the second communication node will predefine the number of transmission beams, so the second communication node uses the predefined number of transmission beams for beam scanning.

Particularly, if the second communication node or the network side cannot determine the capability of the first communication node, and for example, while the second communication node is initiating a random access, or the second communication node or the network side has determined that the first communication node has no calibration capability or has no reciprocity of transmission and reception, then the second communication node or the network side may indicate the first transmission beam parameter and/or the second transmission beam parameter, which is or are transmission beam parameters without any reciprocity, to the first communication node, so that the first communication node uses a larger number of transmission beams for scanning, at a specific time-frequency resource. The so-called reciprocity of transmission and reception generally refers to that there is the same transmission characteristic of a transmitting component and a receiving component of a communication node.

Particularly, if the second communication node or the network side cannot determine the capability of the first communication node, and for example, while the second communication node is initiating a random access, then the second communication node or the network side may alternatively notify the first transmission beam parameter and/or the second transmission beam parameter implicitly. For example, in order for the second communication node or the network side to notify the first communication node available Random Access Channel (RACH) resources, the RACH resources are categorized into several categories, respective categories of the RACH resources correspond to their corresponding first transmission beam parameters and/or second transmission beam parameters, and the first transmission beam parameters and/or the second transmission beam parameters corresponding to different RACH resources may correspond to first communication nodes with different capabilities. The first communication node uses the first transmission beam parameter and/or the second transmission beam parameter corresponding to a specific RACH resource, over the RACH resource according to the calibration capability of the first communication node.

It shall be noted that, even if the communication node has the reciprocity or can guarantee the reciprocity of transmission and reception to some extent, and the second communication node or the network side can obtain the capability of the first communication node, then the second communication node or the network side still may indicate the first transmission beam parameter and/or the second transmission beam parameter without any reciprocity to the first communication node.

Figure 2:
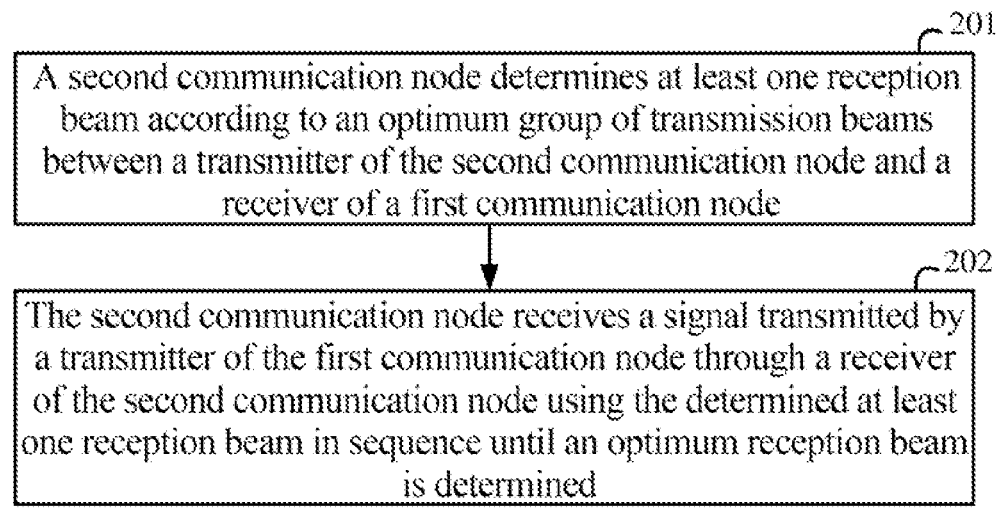
FIG. 2 is a schematic flow diagram of a process of beam scanning performed by a communication node which is a receiving end according to an embodiment of the invention.

Based upon the same inventive idea, in a second embodiment of the invention, as illustrated in FIG. 2, a process of beam scanning performed by a communication node which is a receiving end is as follows.

In operation 201, a second communication node determines at least one reception beam according to an optimum group of transmission beams between a transmitter of the second communication node and a receiver of a first communication node.

Wherein, the optimum group of transmission beams between the transmitter of the second communication node and the receiver of the first communication node is obtained through legacy beam searching or training, etc., or can be obtained through modified legacy beam searching or training, etc., with the first communication node being a receiving end and the second communication node being a transmitting end, although the means by which the optimum group of transmission beams is obtained is not limited herein.

In a particular implementation, the second communication node determines a set of reception beams according to at least one beam in the optimum group of transmission beams, and selects at least one beam from the set of reception beams as the reception beam(s), wherein, the set of reception beams includes at least one beam. For example, the second communication node determines sets of beams by respectively centering on each of a part or all of beams in the optimum group of transmission beams, and determines the determined sets of beams as the set of reception beams.

In a particular implementation, the second communication node determines the set of reception beams according to at least one beam in the optimum group of transmission beams in implementations including but not limited to the following two particular implementations.

In a first implementation, the second communication node selects a part or all of beams in the optimum group of transmission beams to constitute the set of reception beams.

Particularly, the second communication node can select a part or all of beams in the optimum group of transmission beams to constitute the set of reception beams by selecting the beams randomly or under a preset rule, although the embodiment of the invention will not be limited thereto.

In a second implementation, the second communication node determines all available beams by centering on each of a part or all of beams in the optimum group of transmission beams, and selects a part of all the available beams to constitute the set of reception beams.

In operation 202, the second communication node receives a signal transmitted by a transmitter of the first communication node through a receiver of the second communication node using the determined at least one reception beam in sequence until an optimum reception beam is determined.

In a particular implementation, after the second communication node receives the signal transmitted by the transmitter of the first communication node through the receiver of the second communication node using a determined first reception beam, if it determines that the received signal carries identification information of a part or all of beams in an optimum group of transmission beams of the first communication node, then it will stop receiving the signal transmitted by the transmitter of the first communication node using the remaining determined reception beam(s), and determine the optimum reception beam of the receiver of the second communication node according to the identification information.

Figure 3:
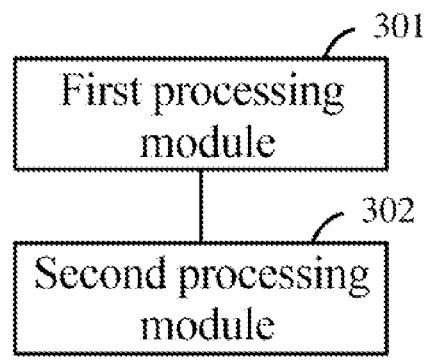
FIG. 3 is a schematic structural diagram of a communication node according to an embodiment of the invention.

Based upon the same inventive idea, an embodiment of the invention provides a communication node, and reference can be made to the description of the first communication node in the first embodiment for a particular implementation of the communication node, so a repeated description thereof will be omitted here; and as illustrated in FIG. 3, the communication node generally includes: a first processing module 301 configured to determine at least one transmission beam according to an optimum group of reception beams between a receiver of the communication node and a transmitter of a second communication node; and a second processing module 302 configured to transmit a signal to the second communication node through a transmitter of the communication node using the determined at least one transmission beam in sequence until an optimum transmission beam is determined.

In a possible implementation, the first processing module is configured to: determine a set of transmission beams according to at least one beam in the optimum group of reception beams, and select at least one beam from the set of transmission beams as the transmission beam(s), wherein the set of transmission beams includes at least one beam.

In a possible implementation, the first processing module is configured to: select a part or all of beams in the optimum group of reception beams to constitute the set of transmission beams; or determine all available beams by centering on each of a part or all of beams in the optimum group of reception beams, and select a part of all the available beams to constitute the set of transmission beams.

In a possible implementation, identification information of a part or all of beams in an optimum group of transmission beams, corresponding to the optimum group of reception beams, of the transmitter of the second communication node is carried in the signal transmitted to the second communication node using the determined at least one transmission beam.

In a possible implementation, the determined at least one transmission beam satisfies a first transmission beam parameter, wherein the first transmission beam parameter includes one or more of the number of transmission beams, generation schemes of respective beams among the transmission beams, or relative relationships between the respective beams among the transmission beams.

In a possible implementation, the second processing module is configured to: transmit the signal to the second communication node using the determined transmission beam according to a second transmission beam parameter; wherein the second transmission beam parameter includes one or more of a time and/or frequency resource for the transmission beam, a time-frequency pattern of the signal transmitted to the second communication node using the determined at least one transmission beam, or a sequence of the signal transmitted to the second communication node using the determined at least one transmission beam.

Figure 4:
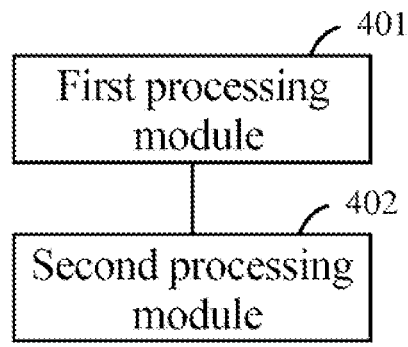
FIG. 4 is a schematic structural diagram of another communication node according to an embodiment of the invention.

Based upon the same inventive idea, an embodiment of the invention provides a communication node, and reference can be made to the description of the second communication node in the second embodiment for a particular implementation of the communication node, so a repeated description thereof will be omitted here; and as illustrated in FIG. 4, the communication node generally includes following components: a first processing module 401, configured to determine at least one reception beam according to an optimum group of transmission beams between a transmitter of the communication node and a receiver of a first communication node; and a second processing module 402, configured to receive a signal transmitted by a transmitter of the first communication node through a receiver of the communication node using the determined at least one reception beam in sequence until an optimum reception beam is determined.

In a possible implementation, the first processing module is configured to: determine a set of reception beams according to at least one beam in the optimum group of transmission beams, and select at least one beam from the set of reception beams as the reception beam(s), wherein the set of reception beams includes at least one beam.

In a possible implementation, the first processing module is configured to: select a part or all of beams in the optimum group of transmission beams to constitute the set of reception beams; or determine all available beams by centering on each of a part or all of beams in the optimum group of transmission beams, and select a part of all the available beams to constitute the set of reception beams.

In a possible implementation, the second processing module is configured to: after receiving the signal transmitted by the transmitter of the first communication node through the receiver of the communication node using a determined first reception beam, if it is determined that the received signal carries identification information of a part or all of beams in an optimum group of transmission beams of the first communication node, stop receiving the signal transmitted by the transmitter of the first communication node using the remaining determined reception beam(s), and determine the optimum reception beam of the receiver of the second communication node according to the identification information.

Figure 5:
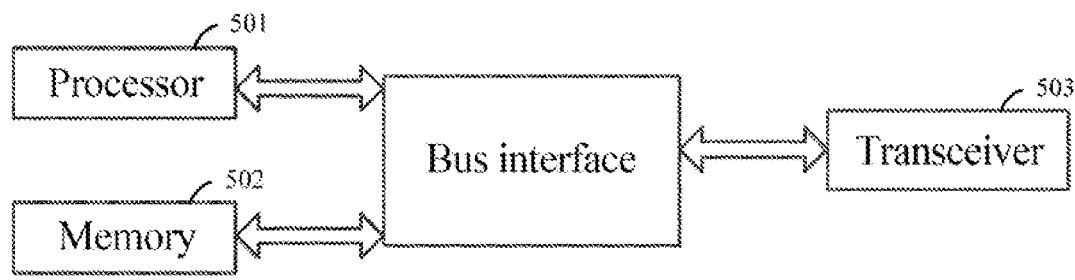
FIG. 5 is a schematic structural diagram of still another communication node according to an embodiment of the invention.

Based upon the same inventive idea, an embodiment of the invention provides a communication node, and reference can be made to the description of the first communication node in the first embodiment for a particular implementation of the communication node, so a repeated description thereof will be omitted here; and as illustrated in FIG. 5, the communication node generally includes a processor 501, a memory 502, and a transceiver 503, wherein the transceiver 503 transmits and receives data under the control of the processor 501, the memory 502 stores preset programs, and the processor 501 reads and executes the programs in the memory 502 to: determine at least one transmission beam according to an optimum group of reception beams between a receiver of the communication node and a transmitter of a second communication node; and transmit a signal to the second communication node through a transmitter of the communication node using the determined at least one transmission beam in sequence until an optimum transmission beam is determined.

In a possible implementation, the processor is configured to determine a set of transmission beams according to at least one beam in the optimum group of reception beams, and select at least one beam from the set of transmission beams as the transmission beam(s), wherein, the set of transmission beams includes at least one beam.

In a possible implementation, the processor is configured to: select a part or all of beams in the optimum group of reception beams to constitute the set of transmission beams; or determine all available beams by centering on each of a part or all of beams in the optimum group of reception beams, and select a part of all the available beams to constitute the set of transmission beams.

In a possible implementation, identification information of a part or all of beams in an optimum group of transmission beams, corresponding to the optimum group of reception beams, of the transmitter of the second communication node is carried in the signal transmitted to the second communication node using the determined transmission beam.

In a possible implementation, the determined at least one transmission beam satisfies a first transmission beam parameter, wherein, the first transmission beam parameter includes one or more of the number of transmission beams, generation schemes of respective beams among the transmission beams, or relative relationships between the respective beams among the transmission beams.

In a possible implementation, the processor is configured to: transmit the signal to the second communication node using the determined transmission beam according to a second transmission beam parameter, wherein, the second transmission beam parameter includes one or more of a time and/or frequency resource for the transmission beam, a time-frequency pattern of the signal transmitted to the second communication node using the determined at least one transmission beam, or a sequence of the signal transmitted to the second communication node using the transmission beam.

Figure 6:
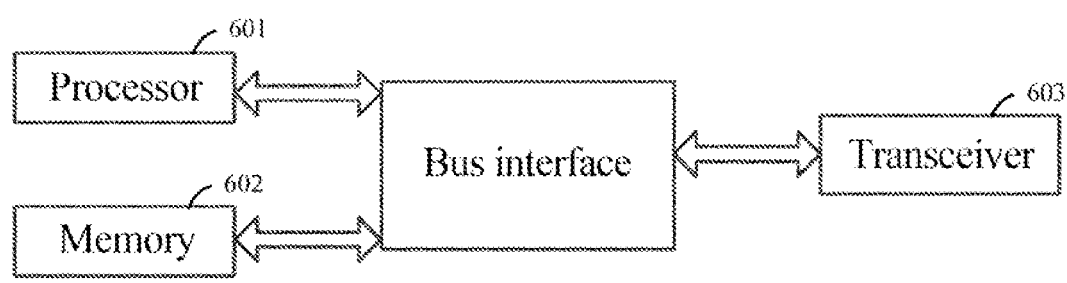
FIG. 6 is a schematic structural diagram of yet another communication node according to an embodiment of the invention.

Based upon the same inventive idea, an embodiment of the invention provides a communication node, and reference can be made to the description of the second communication node in the second embodiment for a particular implementation of the communication node, so a repeated description thereof will be omitted here; and as illustrated in FIG. 6, the communication node generally includes a processor 601, a memory 602, and a transceiver 603, wherein the transceiver 603 transmits and receives data under the control of the processor 601, the memory 602 stores preset programs, and the processor 601 reads and executes the programs in the memory 602 to: determine at least one reception beam according to an optimum group of transmission beams between a transmitter of the communication node and a receiver of a first communication node; and receive a signal transmitted by a transmitter of the first communication node through a receiver of the communication node using the determined at least one reception beam in sequence until an optimum reception beam is determined.

In a possible implementation, the processor is configured to: determine a set of reception beams according to at least one beam in the optimum group of transmission beams, and select at least one beam from the set of reception beams as the reception beam, wherein, the set of reception beams includes at least one beam.

In a possible implementation, the processor is configured to: select a part or all of beams in the optimum group of transmission beams to constitute the set of reception beams; or determine all available beams by centering on each of a part or all of beams in the optimum group of transmission beams, and select a part of all the available beams to constitute the set of reception beams.

In a possible implementation, the processor is configured to: stop receiving the signal transmitted by the transmitter of the first communication node using the remaining determined reception beams, after determining that the signal transmitted by the transmitter of the first communication node is received through the receiver of the communication node using a determined first reception beam and the received signal carries identification information of a part or all of beams in an optimum group of transmission beams of the first communication node, and determine the optimum reception beam of the receiver of the second communication node according to the identification information.

Here in FIG. 5 and FIG. 6, the processor, the memory, and the transceiver are connected through a bus, and the bus architecture can include any number of interconnecting buses and bridges to particularly link together various circuits including one or more processors represented by the processor, and one or more memories represented by the memory. The bus architecture can further link together various other circuits, e.g., a peripheral device, a manostat, a power management circuit, etc., all of which are well known in the art, so a further description thereof will be omitted in this context. The bus interface serves an interface. The transceiver can be a number of elements, e.g., a number of transmitters and receivers, which are units for communication with various other devices over a transmission medium. The processor is responsible for managing the bus architecture and performing normal processes, and the memory can store data for use by the processor in performing the operations.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A beam scanning method, comprising:
   determining, by a first communication node, at least one transmission beam according to an optimum group of reception beams between a receiver of the first communication node and a transmitter of a second communication node; wherein at least one beam is selected from a set of transmission beams as the at least one transmission beam; and the set of transmission beams comprises a part or all of beams in the optimum group of reception beams, or the set of transmission beams comprises a part of all available beams determined by centering on each of a part or all of beams in the optimum group of reception beams;
   transmitting, by the first communication node, a signal to the second communication node through a transmitter of the first communication node using the determined at least one transmission beam in sequence until an optimum transmission beam is determined; and
   wherein identification information of a part or all of beams in an optimum group of transmission beams, corresponding to the optimum group of reception beams, of the transmitter of the second communication node is carried in the signal transmitted by the first communication node to the second communication node through the transmitter of the first communication node using the determined at least one transmission beam.

2. The method according to claim 1, wherein the determined at least one transmission beam satisfies a first transmission beam parameter, wherein the first transmission beam parameter comprises one or more of a quantity of transmission beams, generation schemes of respective beams among the transmission beams, or relative relationships between the respective beams among the transmission beams.

3. The method according to claim 1, wherein transmitting, by the first communication node, the signal to the second communication node through the transmitter of the first communication node using the determined at least one transmission beam comprises:
   transmitting, by the first communication node, the signal to the second communication node using the determined at least one transmission beam according to a second transmission beam parameter; wherein the second transmission beam parameter comprises one or more of a time and/or frequency resource for the determined at least one transmission beam, a time-frequency pattern of the signal transmitted to the second communication node using the determined at least one transmission beam, or a sequence of the signal transmitted to the second communication node using the determined at least one transmission beam.

4. A communication node, comprising: a processor, a memory, and a transceiver, wherein the transceiver transmits and receives data under the control of the processor, the memory stores preset programs, and the processor reads and executes the programs in the memory to:
   determine at least one transmission beam according to an optimum group of reception beams between a receiver of the communication node and a transmitter of a second communication node; wherein at least one beam is selected from a set of transmission beams as the at least one transmission beam; and the set of transmission beams comprises a part or all of beams in the optimum group of reception beams, or the set of transmission beams comprises a part of all available beams determined by centering on each of a part or all of beams in the optimum group of reception beams;
   transmit a signal to the second communication node through a transmitter of the communication node using the determined at least one transmission beam in sequence until an optimum transmission beam is determined; and
   wherein identification information of a part or all of beams in an optimum group of transmission beams, corresponding to the optimum group of reception beams, of the transmitter of the second communication node is carried in the signal transmitted to the second communication node through the transmitter of the communication node using the determined at least one transmission beam.

5. The communication node according to claim 4, wherein the determined at least one transmission beam satisfies first transmission beam parameter, wherein the first transmission beam parameter comprise one or more of a quantity of transmission beams, generation schemes of respective beams among the transmission beams, or relative relationships between the respective beams among the transmission beams.

6. The communication node according to claim 4, wherein the processor is configured to:
- transmit the signal to the second communication node through the transmitter of the communication node using the determined at least one transmission beam according to a second transmission beam parameter; wherein the second transmission beam parameter comprises one or more of a time and/or frequency resource for the determined at least one transmission beam, a time-frequency pattern of the signal transmitted to the second communication node using the determined at least one transmission beam, or a sequence of the signal transmitted to the second communication node using the determined at least one transmission beam.

7. A beam scanning method, comprising:
- determining, by a second communication node, at least one reception beam according to an optimum group of transmission beams between a transmitter of the second communication node and a receiver of a first communication node; wherein at least one beam is selected from a set of reception beams as the at least one reception beam; and the set of reception beams comprises a part or all of beams in the optimum group of transmission beams, or the set of reception beams comprises a part of all available beams determined by centering on each of a part or all of beams in the optimum group of transmission beams; and
- receiving, by the second communication node, a signal transmitted by a transmitter of the first communication node through a receiver of the second communication node using the determined at least one reception beam in sequence until an optimum reception beam is determined;
- wherein receiving, by the second communication node, the signal transmitted by the transmitter of the first communication node through the receiver of the second communication node using the determined at least one reception beam in sequence until the optimum reception beam is determined comprises:
- stopping, by the second communication node, receiving the signal transmitted by the transmitter of the first communication node using a remaining determined reception beam, after determining that the signal transmitted by the transmitter of the first communication node is received using a determined first reception beam and the received signal carries identification information of a part or all of beams in an optimum group of transmission beams of the first communication node, and determining the optimum reception beam of the receiver of the second communication node according to the identification information.

8. A communication node, comprising: a processor, a memory, and a transceiver, wherein the transceiver transmits and receives data under the control of the processor, the memory stores preset programs, and the processor reads and executes the programs in the memory to perform the method according to claim 7.

9. The communication node according to claim 8, wherein the processor is configured to:
- determine a set of reception beams according to at least one beam in the optimum group of transmission beams, and select at least one beam from the set of reception beams as the at least one reception beam, wherein the set of reception beams comprises at least one beam.

10. The communication node according to claim 9, wherein the processor is configured to:
- select a part or all of beams in the optimum group of transmission beams to constitute the set of reception beams; or
- determine all the available beams by centering on each of a part or all of beams in the optimum group of transmission beams, and select a part of all the available beams to constitute the set of reception beams.

11. The communication node according to claim 9, wherein the processor is configured to:
- stop receiving the signal transmitted by the transmitter of the first communication node using a remaining determined reception beam, after determining that the signal transmitted by the transmitter of the first communication node is received through the receiver of the communication node using a determined first reception beam and the received signal carries identification information of a part or all of beams in an optimum group of transmission beams of the first communication node, and to determine the optimum reception beam of the receiver of the second communication node according to the identification information.

* * * * *